(12) United States Patent
Kleist

(10) Patent No.: US 6,488,112 B1
(45) Date of Patent: Dec. 3, 2002

(54) ELECTROHYDRAULIC STEERING SYSTEM

(75) Inventor: Alexander Kleist, Düsseldorf (DE)

(73) Assignee: TRW Fahrwerksysteme GmbH & Co. KG, Dusseldorf (DE)

( * ) Notice: Subject to any disclaimer, the term of this patent is extended or adjusted under 35 U.S.C. 154(b) by 0 days.

(21) Appl. No.: 09/713,915

(22) Filed: Nov. 16, 2000

(30) Foreign Application Priority Data

Nov. 16, 1999 (DE) ..................... 299 20 122 U

(51) Int. Cl.[7] .................................................. B62D 5/00
(52) U.S. Cl. ...................................................... 180/403
(58) Field of Search ................................. 180/403, 417, 180/421, 422, 423

(56) References Cited

U.S. PATENT DOCUMENTS 6,209,677 B1 * 4/2001 Bohner et al.
6,213,246 B1 * 4/2001 Bohner et al.
6,244,371 B1 * 6/2001 Bohner et al.
6,279,675 B1 * 8/2001 Bohner et al.

* cited by examiner

Primary Examiner—Kevin Hurley
(74) Attorney, Agent, or Firm—Tarolli, Sundheim, Covell, Tummino & Szabo L.L.P.

(57) ABSTRACT

An electrohydraulic steering system comprises a servo cylinder which has two chambers, an electric motor and a servo pump connected to the electric motor and being adapted to be driven in two different directions. The servo pump is directly connected to the servo cylinder and, depending on the driving direction, is able of pressurizing one or the other of the chambers of the servo cylinder with a volume flow of a hydraulic fluid. The system further comprises a control unit controlling the electric motor.

2 Claims, 1 Drawing Sheet

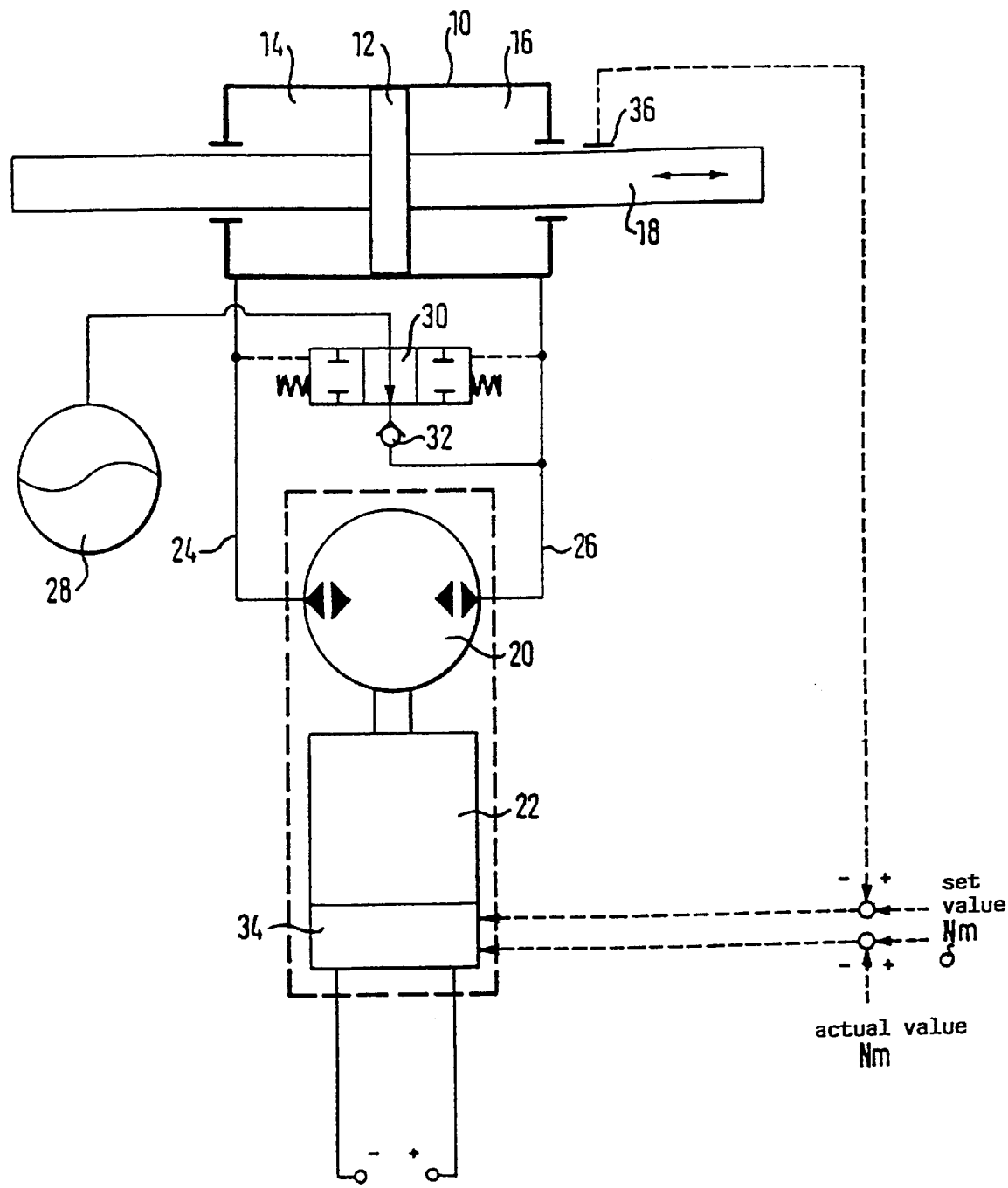

ELECTROHYDRAULIC STEERING SYSTEM

BRIEF DESCRIPTION OF THE INVENTION

A typical electrohydraulic steering system comprises a servo cylinder which can be acted upon selectively by a flow of hydraulic fluid in order to transmit a steering supporting force to steerable wheels of the vehicle.

One such electrohydraulic steering system comprises typically a servo pump powered by an electric motor at a speed which will vary between idling and full load depending on the requirements. The flow of hydraulic fluid furnished by the servo pump is applied to a servo valve which supplies the portion of the flow needed to generate the servo force assisting steering to the corresponding chamber of the servo cylinder, the excess flow being led back to the reservoir.

So that in a steering movement the required servo force assisting steering is made available without delay, the servo pump needs to permanently furnish a minimum flow on idling. This results in high energy consumption of the system. In addition, the servo valve results by principle in the flow furnished by the servo pump being throttled by the at least two resistances, thus incurring losses which likewise result in an increased energy consumption.

The object of the invention is to provide an electrohydraulic steering system featuring a simple configuration and cost-effective manufacture.

BRIEF DESCRIPTION OF THE INVENTION

The invention provides an electrohydraulic steering system comprising a servo cylinder which has two chambers, an electric motor, a servo pump connected to the electric motor, the servo pump being directly connected to the servo cylinder and, depending on the driving direction, being able of pressurizing one or the other chamber of the servo cylinder with a volume flow of a hydraulic fluid, and a control unit controlling the electric motor. The steering system in accordance with the invention thus manages without a servo valve, resulting in for one thing a considerable saving in cost, due to a servo valve being a highly sophisticated component, and for another, saving energy since the throttling losses automatically involved in conjunction with a servo valve are eliminated. Instead of controlling the flow supplied to the servo cylinder by a servo valve, the servo pump is now directly controlled so that it furnishes the necessary flow in each case, i.e. when no servo force assisting steering is needed then the pump is idle. This results in a considerable saving in energy. An additional saving in cost materializes in conclusion by the steering system in accordance with the invention having an extremely simple configuration.

Controlling operation of the servo pump is achieved particularly simply by the control unit signaling the electric motor. For this purpose a closed loop control is used which furnishes the parameters: wanted steering angle, actual steering angle, wanted steering moment and actual steering moment. It is on the basis of these parameters that the speed and/or torque of the electric motor driving the servo pump, preferably a constant delivery pump, is controlled.

In accordance with the preferred embodiment of the invention a reservoir is provided which maintains the hydraulic system at a pressure corresponding to roughly half the maximum system pressure. In this way a high system pressure is already instantly available when the servo pump is started without the servo pump first needing to build up such a pressure. A charging valve, for example, may be provided which opens and closes the connection to the reservoir depending on the pressure in the hydraulic system so that it is automatically maintained primed.

Advantageous aspects of the invention read from the sub-claims.

BRIEF DESCRIPTION OF THE DRAWING

The sole FIGURE is a schematic illustration of a steering system in accordance with the invention.

DETAILED DESCRIPTION OF THE INVENTION

The electrohydraulic steering system contains a servo cylinder 10 with a piston 12 dividing the interior of the actuator cylinder into two chambers 14, 16. By the one or the other of the two chambers being pressurized the piston 12 and thus the piston rod 18 connected thereto is displaced. The piston rod 18 is connected to the steered wheels (not shown) of the vehicle so that a displacement of the piston 12 in the servo cylinder 10 permits communicating a servo force assisting steering to the vehicle wheels.

A servo pump 20 is provided powered by an electric motor 22. The servo pump 20 can be operated to deliver in two directions, one side of the servo pump 20 being connected to the first chamber 14 of the servo cylinder 10 by a pressure conduit 24 and the other side of the pump 20 being connected to the second chamber 16 by a pressure conduit 26. In this way a closed system is formed, filled with hydraulic fluid.

A reservoir 28 is provided filled with pressurized hydraulic fluid at a pressure corresponding to roughly half the maximum hydraulic pressure in the hydraulic system formed by the two chambers 14, 16, the two pressure conduits 24, 26 and the servo pump 20. The reservoir 28 communicates with the hydraulic system via a charging valve 30 and a check valve 32 resulting in the hydraulic system being maintained at the pressure existing in the reservoir 28.

The electric motor 22 is controlled by an electronic control unit 34. The control unit 34 receives the wanted values for the steering angle and steering moment as well as the actual values of the steering moment and steering angle. Furthermore, the control unit 34 receives a parameter corresponding to the steering angle or travel of the servo cylinder. For this purpose a sensor 36 is provided. In all, a closed loop control is formed.

The functioning of the steering system is as follows: when the control unit 34 "sees" that a servo force assisting steering needs to be provided, for example from the wanted value for the steering angle as may be sensed at one steered wheel of the vehicle or from the difference between the wanted value and actual value for the steering moment, the servo pump 20 is powered in the corresponding direction to suitably pressurize the one or the other of the two chambers 14, 16. The pressure for doing this is instantly available since the hydraulic system is primed by the reservoir 28, i.e. the servo pump 20 does not first need to build up a system pressure directly on starting. As soon as the control unit 34 "sees" that no further servo force assisting steering is needed the electric motor 22 is again signaled OFF so that the servo pump 20 is idle. It is in this way that energy for powering the steering system is only needed when a servo force assisting steering is also actually needed. In addition, no complicated mechanical components are needed to supply the flow made available by the servo pump to the chambers 14, 16 since this flow is made available directly by the pump in just the right amount and right direction.

What is claimed is:

1. An electrohydraulic steering system comprising a servo cylinder which has two chambers, an electric motor, a servo pump connected to said electric motor and being adapted to be driven in two different directions, said servo pump being directly connected to said servo cylinder and, depending on said driving direction, being able of pressurizing one or the other of said chambers of said servo cylinder with a volume flow of a hydraulic fluid, and a control unit controlling said electric motor, and wherein a reservoir is provided maintaining said hydraulic system at a pressure corresponding to roughly half of a maximum system pressure.

2. The steering system of claim 1, wherein a charging valve is provided which opens and closes a connection to said reservoir depending on said pressure in said hydraulic system.

* * * * *